United States Patent
Paton et al.

[11] 3,900,149
[45] Aug. 19, 1975

[54] METHOD OF PRODUCING ANTI-SKID STUDS FOR VEHICLE TIRES

[76] Inventors: Boris Evgenievich Paton, ulitsa Kotsjubinskogo, 9, kv. 21; Vladimir Alexeevich Gusev, ulitsa Malopodvalnaya, 14, kv. 9; Daniil Andreevich Dudko, pereulok Mechnikova, 3, kv. 7; Boleslav Ivanovich Maximovich, Bulvar Lesi Ukrainki, 2, kv. 52; Grigory Bagradovich Asoyants, Bulvar Lesi Ukrainki, 2, kv. 16, all of Kiev, U.S.S.R.

[22] Filed: May 4, 1973

[21] Appl. No.: 357,273

Related U.S. Application Data

[63] Continuation of Ser. No. 214,324, Dec. 30, 1971, abandoned.

[30] Foreign Application Priority Data

Jan. 4, 1971  U.S.S.R.............................. 1603843
Feb. 16, 1971  U.S.S.R.............................. 1618804

[52] U.S. Cl................ 228/122; 228/173; 228/234; 228/248; 152/210; 228/199
[51] Int. Cl............................................. B23k 31/02
[58] Field of Search ........ 29/DIG. 4, 470, 489, 420, 29/500, 494, 475, 192, 501, 473.1, 487; 152/210

[56] References Cited
UNITED STATES PATENTS

| | | | |
|---|---|---|---|
| 2,572,996 | 10/1951 | Dunlap ............................ | 152/210 |
| 3,125,147 | 3/1964 | Hakka.................................. | 152/210 |
| 3,138,837 | 6/1964 | Weeton et al. ..................... | 29/500 X |
| 3,301,300 | 1/1967 | Natter................................. | 152/210 |
| 3,444,613 | 5/1969 | Foerster.............................. | 29/473.1 |
| 3,471,921 | 10/1969 | Feenstra ............................ | 29/501 X |
| 3,480,062 | 11/1969 | Hillhouse............................ | 152/210 |
| 3,593,771 | 7/1971 | Carlstedt et al. ................... | 152/210 |
| 3,686,910 | 8/1972 | Fuchs, Jr. ................................ | 72/60 |
| 3,827,885 | 8/1974 | Baum................................. | 75/204 X |

FOREIGN PATENTS OR APPLICATIONS

429,613  7/1911  France

*Primary Examiner*—Ronald J. Shore
*Attorney, Agent, or Firm*—Holman & Stern

[57] ABSTRACT

An anti-skid stud for vehicle tires has a metal extruded body in the form of a sleeve having a beaded flange and a cavity; at the bottom of the cavity is fused a layer of a wear-resistant composite alloy, using a binder material. A method of producing the stud contemplates manufacture by extrusion from a metal blank to produce the stud body in the form of a sleeve with the beaded flange, the method includes the scope of charging the cavity with granular hard-alloy material and a binder-alloy and heating until the binder-alloy is fused, to produce a consolidated core of the wear-resistant composite alloy in the finished anti-skid stud.

1 Claim, 2 Drawing Figures

METHOD OF PRODUCING ANTI-SKID STUDS FOR VEHICLE TIRES

This is a continuation of application Ser. No. 214,324, filed Dec. 30, 1971, now abandoned.

BACKGROUND OF THE INVENTION

1. Field of the Invention

The present invention relates to anti-skid studs for vehicle tires and to methods for producing such anti-skid studs.

2. Description of Prior Art

An efficient way of increasing both the safety and speed of traffic on snow- and ice-covered roads is the use of studded tires which found wide application during the last decade. The practice showed that with studded tires safe traffic speed on ice-glazed and snow-covered roads can be doubled. Further, with the studded tires the braking distance on such roads is reduced nearly by 40–60%. The studs are of particular importance for such vehicles as motor- and trolley-buses in mountainous regions and at mining plants, interurban truck-trailer combinations, ambulance cars, emergency service cars and fire-tenders.

The known anti-skid studs for vehicle tires comprise a metal body having a hard-alloy tip or center. The studs are inserted in protecters and act as a means for improving the braking as well as cohesion with the road surface. However, the manufacture of the anti-skid studs of prior art is rather a labour-consuming operation. The body of each stud is turned on a lathe to produce a cavity and to form ridges on its exterior whose function is to keep the stud in the tire where it is pressed. The cavity in the stud body is designed to accommodate a hard-alloy rod which is brazed on being introduced. A certain part of the operations involved in the manufacture of prior art studs is carried out by hand. That is why the production of known studs is a labor-consuming and expensive operation. In addition, the hard-alloy centers (rods) will have to be produced to close tolerances and this further tends to increase the cost and labour input of high-skilled workers engaged in producing the studs. From 400 to 1200 studs are required for the tires of one car, and accordingly, millions of studs are produced each year.

Cars with non-studded tires cannot effectively negotiate high speed traffic and are thus liable to create road accidents. This is why in certain countries driving cars with non-studded tires on roads having snow and sleet is prohibited. With an ever increasing number of vehicles, higher speeds and safe traffic requirements at inconducive wheather conditions necessitates mass production of inexpensive studs.

The large-scale fabrication of anti-skid studs is imperative though high cost of production according to prior art methods hampers their wide usage, and the present invention aims at reducing the cost of mass-production of such anti-skid studs.

DESCRIPTION OF THE INVENTION

The above objects are achieved in the present invention in an anti-skid stud for vehicle tires, said studs comprising a metal flanged body having a cavity accommodating a wear-resistant part; the stud body, conforming to the present invention, is extruded in the form of a sleeve with a beaded flange, the wear-resistant part constituting a layer of a wear-resisting composite alloy fused at the bottom of the body interior and containing hard alloy granules fused together and to the body with the aid of a binder-alloy.

When manufacturing the wear-resistant part of the anti-skid stud use may be made of crushed metal scrap and hard alloy rejects.

For fabricating the aforesaid anti-skid stud a method has been worked out which contemplates producing the stud body of a metal blank with the body having a flange and a cavity charged subsequently with a wear-resistant part of the stud, in which method conforming to this invention the stud body is extruded in a form of a sleeve with the beaded flange and sleeve cavity is filled with a hard-alloy granulated material and a granulated binder-alloy, whereupon the stud body is heated in an atmosphere protecting it against oxidation to a temperature exceeding the melting point of the binder-alloy by 50°–150°C after which the anti-skid stud produced is subjected to cooling.

The above method allows using rejected hard-alloy materials and reduces labour input, being therefore more efficient as against conventional procedures for manufacturing anti-skid studs.

As to the hard-alloy granular material it would be expedient to feed at first a granulated superhigh-wear-resistant hard-alloy material and then a granulated hard-alloy material of medium wear-resistance. By this virtue the studs protrude from the tire surface at one and the same distance lasting the entire service life.

As to the binder-alloy use can be made of a granulated material containing: 30–40 percent nickel, 30–40 percent manganese by weight the rest being copper.

The foregoing composition ensures a guaranteed wetting of the hard-alloy granules and the stud body walls which results in production of high-quality studs.

It is desirable to subject the cooled studs to an extra heating up to 400°–450°C followed by holding at this temperature for 12–24 hours.

This is accompanied by the aging of the hard-alloy layer enclosed within the cavity of the stud body and with a substantial increase in its hardness.

As cast binder-alloy features high ductility with its hardness ranging within 52–60 HRA, on being subjected to additional heating to a temperature of 400°–450°C and holding for 12–24 hours its hardness number increases to 75–80 HRA. As a result the wear-resistance of the fused composite alloy layer is increased to such a degree that even after a prolonged service the studs protrude from the tire surface at a distance of 1.5–2.0 mm, i.e. within the requisite limits.

BRIEF DESCRIPTION OF THE DRAWING

For the purpose of enabling those skilled in the art to obtain a better understanding of the invention described below are exemplary embodiments of the studs and a method for their fabrication to be considered with due reference to the appended drawings in which.

Figure 1:
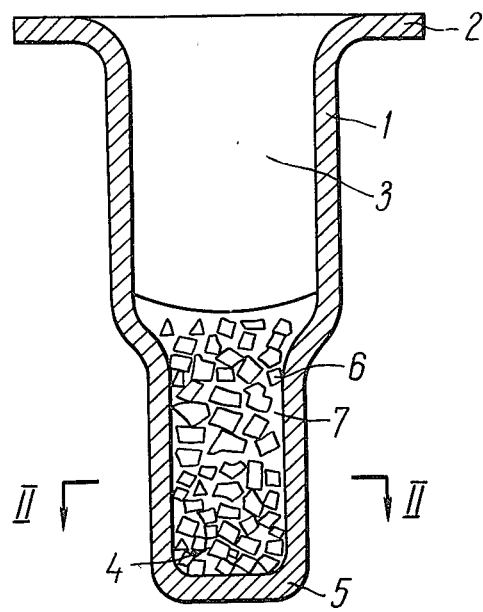
FIG. 1 is a longitudinal section of a stud.
Figure 2:
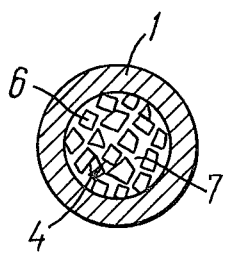
FIG. 2 illustrates section II—II of FIG. 1.

An anti-skid stud for vehicle tires comprises body 1 extruded of a metal blank (steel strip) (FIGS. 1 and 2); the body is a sleeve having a beaded flange 2 and cavity 3 for receiving a wear-resistant part 4. Fused at the bottom 5 of cavity 3 is wear-resistant composite alloy material 4 which constituted the wear-resistant portion of the stud, the wear resistant material contains hard alloy granules 6 fused together and to body 1 with a binder-alloy 7.

The anti-skid stud body 1 may be either round or ribbed in cross-section.

In a lengthwise direction; the body 1 of the stud may have a variable cross-section of ridges (ribs) which serve to prevent the stud from turning round in a tire casing and to retain the stud in the tire rubber more reliably.

The method of production of the anti-skid studs for vehicle tires involves manufacturing stud body 1 of steel strip or rod by extruding it in the form of the sleeve having a beaded flange 2.

The bottom 5 of cavity 3 in body 1 is filled with hard-alloy material 6 and granulated binder-alloy 7. The afore-said bodies 1 (sleeves) filled with the granulated material undergo heating in an atmosphere protecting against oxidation (i.e., neutral, reducing or carburazing). Heating is effected to a temperature exceeding the melting point of the binder-alloy by 50°–150°C where use is made of an alloy having the following composition in percentage by weight: 30–40 nickel, 30–40 manganese and the rest - copper, the heating temperature in such a case is equal to 980°–1130°C. In the course of heating, the binder-alloy is fused and further heated, thus wetting the surface of each granule of the hard alloy and the walls of the stud body, whereas during subsequent cooling, the granules of the hard alloy are fused to both the binder-alloy mass and the stud body.

Subsequently, the studs can be subjected to additional heating to a temperature of 400°–450°C whereupon they are held at this temperature for 12–24 hr. This results in a rise in hardness number ranging from 52–60 to 75–80 HRA.

In another exemplary embodiment of the method of fabricating the anti-skid studs, the cavity in the stud body is at first charged with 0.5–0.7 g. of a granular superhigh-wear-resistant material having a hardness number of 91–93 HRA and a composition by percent by weight: 15 — titanium carbide, 6 — cobalt, the rest being tungsten carbide. Next, 0.5–0.7 g. of a granulated material is added, the material featuring medium wear-resistance and hardness ranging within 88–90 HRA and containing (by weight) 8% cobalt the rest being tungsten carbide, subsequently 0.4–0.6 g. of a granular binder-alloy is charged, which contains (by weight) 30–40% nickel, 30–40% manganese, the rest being copper. The preferred granule size of the foregoing material ranges within 0.2–1.6 mm.

Tests have shown that the anti-skid studs manufactured by using the above technique afford a number of distinct advantages in comparision with the known studs. Studs manufactured as described above are not inferior in wear-resistance to the prior art studs having hard-alloy centers. Thus, after a 12,000-km. test run over a hard asphalt paving it was seen that 10% of the conventional studs got dislodged out of the tire material and lost as against only 0.5% of the studs produced in compliance with the method of the invention.

Besides, the studs produced as described hereinbefore cause a lesser overheating of the surrounding rubber, which is attributable to the stud tubular body causing a decrease in the amount of heat transfer, thereby contributing to better retention of the studs in a tire.

What is claimed is:

1. A method of producing an anti-skid stud for vehicle tires, comprising the steps of: forming from a metal blank a sleeve with a stud body having a closed cavity projecting from a peripheral flange; charging the cavity of the said sleeve with granular material comprising a granular pre-selected hard alloy and a granular binder-alloy; heating said stud body charged with the said granular materials in a protected atmosphere preventing oxidation, to a temperature exceeding the melting point of the binder-alloy by a temperature in the range of 50°–150°C to insure and cause wetting of said granular material and at least part of the inside surface of said stud body and forming an integrated and a consolidated hard core of said granular material integrally and intimately adhered to the sleeve cavity in the anti-skid stud produced;

and subsequently heating the charged stud in a second and additional stage to a temperature of 400°–450°C for a duration of 12–24 hours;

and subsequently cooling the stud;

wherein said charging step includes charging the stud cavity with 0.5–0.7 g. of a first material comprising by percentage of weight of 15% titanium carbide, six percent cobalt and the remainder being tungsten carbide; including in the charge 0.5–0.7 g. of a second material including, by percentage weight, 8% cobalt and the remainder being tungsten carbide; and forming the remainder of the charge as 0.4–0.6 g. of the granular binder-alloy containing by percentage of weight 30–40 % nickel, 30–40 % manganese and the remainder as copper.

* * * * *